United States Patent [19]

Lewine

[11] 4,224,681
[45] Sep. 23, 1980

[54] PARITY PROCESSING IN ARITHMETIC OPERATIONS

[75] Inventor: Donald A. Lewine, Marlborough, Mass.

[73] Assignee: Digital Equipment Corporation, Maynard, Mass.

[21] Appl. No.: 969,955

[22] Filed: Dec. 15, 1978

[51] Int. Cl.³ .............................................. G06F 11/10
[52] U.S. Cl. ........................................ 364/738; 371/49
[58] Field of Search .................. 364/738, 200, 900; 340/146.1 AG

[56] References Cited

U.S. PATENT DOCUMENTS

| 3,531,631 | 9/1970 | Burgess | 340/146.1 AG |
| 3,751,646 | 8/1973 | Geng et al. | 340/146.1 AG |
| 3,806,716 | 4/1974 | Lahti et al. | 340/146.1 AG |

OTHER PUBLICATIONS

Williams, Parity-Check Generate Circuit, IBM Technical Disclosure Bulletin, vol. 12, No. 4, Sep. 1969, p. 623.

*Primary Examiner*—Charles E. Atkinson
*Attorney, Agent, or Firm*—Cesari & McKenna

[57] ABSTRACT

Method and apparatus for parity checking of data, particularly in relation to data used and/or generated by an arithmetic logic unit of a data processing system. Parity is generated for all operations but examined only in connection with those operations which results in valid parity. For these operations which do not directly result in valid parity, parity is ignored. A "parity valid" bit is associated with those operations which generate valid parity and a parity error is indicated only when the parity valid bit occurs at the same time as a parity error.

4 Claims, 1 Drawing Figure

PARITY PROCESSING IN ARITHMETIC OPERATIONS

FIELD OF THE INVENTION

This invention relates to data processing systems in which errors are detected by means of parity checking and, in particular, to a simplified apparatus and method for parity checking in arithmetic operations.

BACKGROUND OF THE INVENTION

The use of parity checking for error detection in digital systems is well established. While parity checking may be applied to many situations, the application of parity checking to arithmetic operations is of particular interest. Generally, any arithmetic operation has at least two operands from which a result is derived. This result may be a quotient, product, sum, difference, etc. Each of the operands and results may have their parity separately checked. In some operations, the parity of the result corresponds to the parity of one or more operands, although there is no simple correspondence for other operations between the parity of the result and the parity of the operand. Prior to this invention, parity of the result has been determined either by separately computing parity on the result per se or by correcting for the effect on parity of the operation performed on the operands.

SUMMARY OF THE INVENTION

It has been determined, however, that it is not necessary to check parity for every operation in order to locate faults in the arithmetic logic unit. Parity checking of a representative subset of operations performed will suffice if the subset is judiciously chosen; then an equipment failure of the type which would produce a parity error in the non-parity-checked operations will generally produce a parity error in the subset of operations in which parity is checked. This is the approach taken in the present invention. It has the advantage of requiring only a small amount of hardware to check the data paths for many operations, without requiring the substantially larger and more complex hardware which would be required to perform such checks for every operation.

Each data word comprised of m+n bits is treated as a combination of first and second half words of m or n bits each, respectively. The parity checking scheme of the present invention is separately performed on each of these half words. Or, if the data processing system word length is sufficiently short, the parity checking scheme may be applied to an entire word as a whole. Two bits are generated and stored in an internal register in conjunction with each half word or word, as appropriate. The first of these two bits is a parity bit which is conventionally generated. The second of the two bits, termed the "parity valid" bit, is supplied by the instruction which generates the word, to indicate whether that instruction results in valid or invalid parity. When data is read from the internal register there is a parity error if and only if the parity bit indicates an error, the parity valid bit is set (indicating that the instruction results in valid parity) and the instruction code enables a parity check. The latter feature is redundant to some extent, and is therefore optional; it is included, though, to permit the flexibility of separately performing parity screening when a data word is generated and when it is read from memory.

In most data processing systems, there are sections of the processor or arithmetic logic unit, e.g., the adder, which do not lend themselves to simple parity checking. The choice is either to have complex hardware or to not check those parts of the processor data paths. The present invention checks parity for many operations but does not require the complex hardware necessary to generate correct parity for all operations. Accordingly, parity is not checked for operations such as the aforementioned addition operation. To this end, the instruction code provides the parity valid bit in a specified state to permit parity generation and checking for a set of predetermined operations while not providing the parity valid bit in that state in connection with other operations. The selection of a set of instructions for parity checking and a set for which parity is not checked depends on the particular hardware design of the data processing system to which this invention is applied; and due to the many different system designs known, generalization as to the choice of instruction sets is avoided herein. The user must make reference to the characteristics of his system in chosing the instruction set which provides the parity valid bit.

Parity is checked both when such an operation generates a data word and when a data word is read out of memory. A further check is preformed to determine, in connection with a particular word, whether the parity which is stored with that word is the same parity which is read back from the internal register.

Means are also provided for overriding the above-described parity verification scheme, to permit the reading of data having bad parity, for diagnostic purposes.

BRIEF DESCRIPTION OF THE DRAWING

These and other features of the present invention will be more fully understood by reference to the accompanying drawing in which.

DETAILED DESCRIPTION OF A PREFERRED EMBODIMENT

Figure 1:
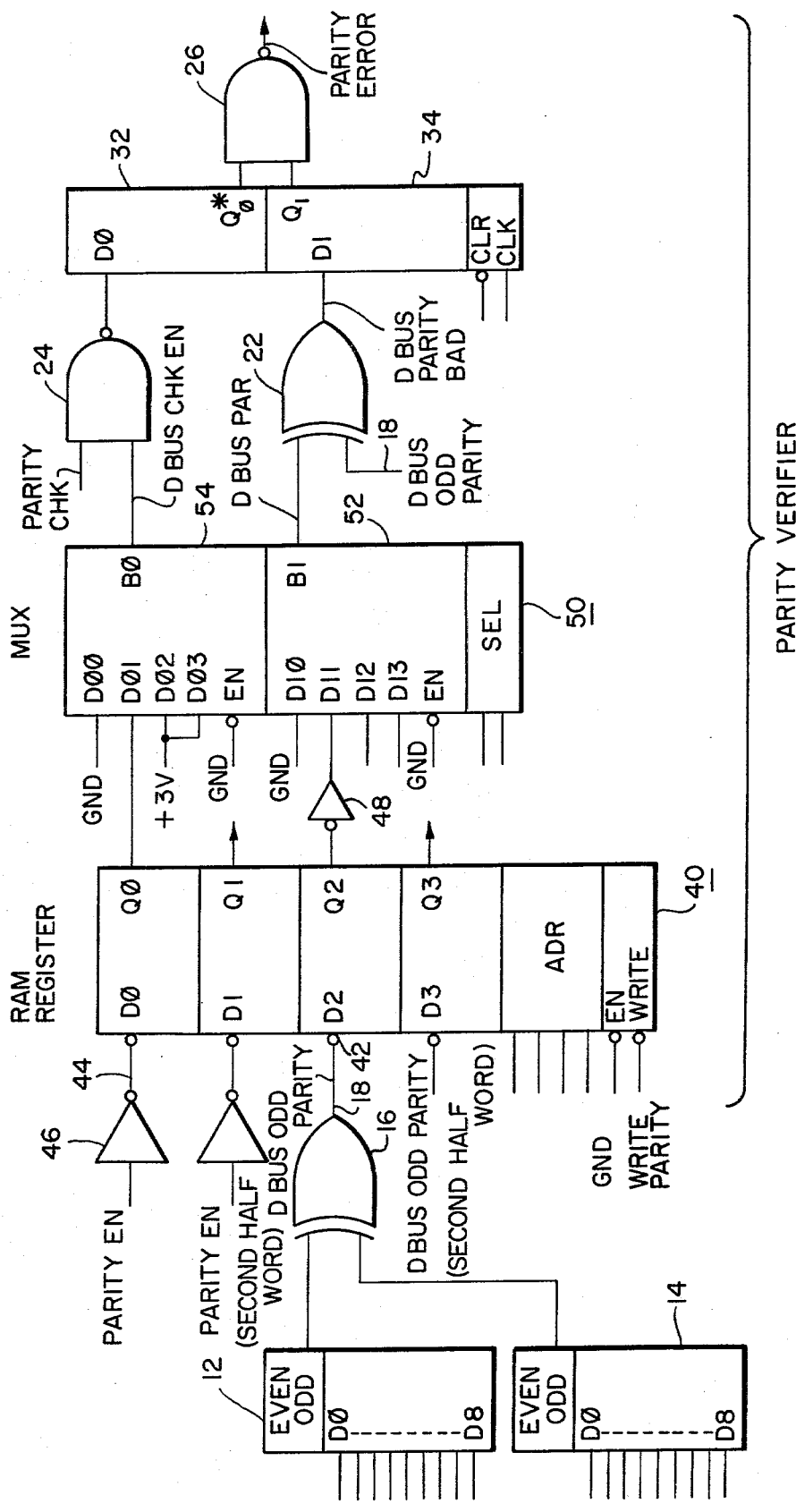
FIG. 1 is a schematic circuit diagram of an embodiment of the present invention.

Referring now to FIG. 1, there is shown a detailed, schematic circuit diagram of an embodiment of the present invention as formulated for use in the model KS10 processor of Digital Equipment Corporation, of Maynard, MA.

The particular embodiment illustrated is applied to the situation in which each word of data is comprised of 36 bits. The half-words are, in turn, selected to be 18 bits each. As the half words are similarly processed, the following description will be limited to just one half word, it being understood that the apparatus is duplicated for the other half word, except as indicated. Two 9-input exclusive-OR parity generators 12 and 14 read the bits in a first half word and their odd parity outputs are combined in exclusive OR gate 16 to generate the half-word parity on line 18. The 9-input exclusive OR parity generators may, for example, be type 74S280 integrated circuits. The parity signal generated on line 18, referred to as the DBUS ODD PARITY signal, represents the parity which is stored for the half word.

More particularly, the parity generators 12 and 14 read the data path or bus which connects to the arithmetic logic unit of the data processing system's central processor. Thus, the DBUS ODD PARITY signal represents the parity of a (half) word read from the data bus.

For checking the reading of the half word from memory, the DBUS ODD PARITY signal on line 18 is supplied to one input of exclusive-OR gate 22, representing the parity of the data appearing on the data bus, from memory. The other input of exclusive-OR gate 22 receives a signal representing the original, recorded parity of that data; this latter signal is referred to as the DBUS PAR signal. The output of exclusive-OR gate 22 is termed the DBUS PARITY BAD signal. The DBUS PARITY BAD signal represents a comparison between the parity of the data which was originally generated and stored and the parity of the corresponding data read from memory; ideally the two should be the same and the DBUS PARITY BAD signal will be low. If both inputs of exclusive OR gate 22 are not the same, the DBUS PARITY BAD signal will be high, indicating that a problem exists.

In checking the parity of data which is read and which had previously been stored, NAND gates 24 and 26 and D-type flip-flops 32 and 34 are also used. NAND gate 24 receives two inputs; the first input is a signal termed DBUS CHK EN which indicates whether the word being read is one for which parity was previously generated, and the second is the PARITY CHK signal which is generated by the instruction command to indicate whether the parity checking system should respond to the parity of the word being read. The output of NAND gate 24 is applied to the input of D-type flip-flop 32. The DBUS PARITY BAD signal generated by exclusive-OR gate 22 is supplied to the input of flip-flop 34. The Q* and Q outputs of flip-flops 32 and 34 respectively, are supplied to the inputs of NAND gate 26. The output of NAND gate 26 is a signal indicating the presence of a parity error from the associated half-word, i.e., the PARITY ERROR signal. This signal may be used to halt operation upon the detection of a parity error or to merely indicate the presence of the error, according to the desire of the user.

It will be observed that the D-type flip-flops 32 and 34 are clocked simultaneously and that they have no significance other than synchronization, i.e., to cause the inputs to NAND gate 26 to be as desired at an appropriate point in time.

As above mentioned, two bits are stored together with each half-word when data is written to memory. The internal register for this purpose may, for example, be a 16×4 random access memory (RAM) such as the type 74S189 integrated circuit. For each half-word there are two inputs to this register. The first input is the complement of the DBUS ODD PARITY signal supplied on line 18 at the output of exclusive-OR gate 15. This DBUS ODD PARITY signal, representing the parity bit generated by the parity generator, is supplied to one input 42 of register 40. The other of the two signals associated with the same half-word is supplied to the register on an input line 44 through an inverter 46. The input to inverter 46 is a signal generated by the instruction which creates the data word, to indicate whether parity is valid or invalid for that word; this signal is referred to as the PARITY EN (i.e., parity enable) signal.

In the embodiment illustrated, the outputs of the RAM register 40 are supplied to a multiplexer 50. The multiplexer may, for example, be embodied as a type 74LS153 integrated circuit having two outputs and four inputs related to each output, with selection logic for determining which of the four inputs supplies the output. Acutally, there are two multiplexers, one for each output. The parity bit is supplied by inverter 48 to input D11 of multiplexer 52 and the parity valid bit is supplied to input D01 of multiplexer 54. The associated outputs of the multiplexers are referred to as the DBUS PAR and DBUS CHK EN signals, respectively.

Multiplexers 52 and 54 are not necessary to the operation of the invention per se. For purposes of this invention alone, the multiplexers could be bypassed. However, in the KS10 processor the multiplexers are needed for other reasons and by incorporating them into the parity checker, they can also be monitored to detect whether they are functioning correctly. Multiplexers 52 and 54 can also assist field service personnel; by properly addressing the multiplexers, the DBUS CHK EN signal may be forced to a high or low state and thereby cause the parity checking apparatus to function as though parity is always valid or always wrong. This assists service personnel in locating faulty hardware. Further, the parity checking hardware can be employed to check parity of other signals which could be connected to the other inputs of multiplexer 52, as desired.

It should be realized that the description of the circuitry of FIG. 1 pertains to only one 18 bit half-word. For a 36 bit word, this hardware would thus be duplicated for a second half-bit. Or, if the full word is only 18 bits long, duplication for a second half-word will be unnecessary.

It is further understood and to be expected that various improvements, modifications and alterations of the apparatus disclosed will readily occur to those skilled in the art and that such improvements, modifications and alterations are intended to be within the spirit and scope of this invention. Accordingly, it is intended that the invention be limited only by the following claims:

What is claimed as new and desired to be secured by Letters Patent of the United States is:

1. A parity checking apparatus for use in a data processing system to check the parity of data words of a plurality of bits each, the data processing system being controlled by instructions which determine operations to be executed, comprising:
    means for generating a parity signal representing the parity of a data word;
    means responsive to the executed instruction which produced the data word for determining whether such instruction results in data with valid parity, to generate a parity valid signal when the executed instruction produces data with valid parity; and
    means responsive to the parity valid signal and the parity signal for generating a parity error signal in response to the generation of incorrect parity from an instruction which results in data with valid parity.

2. A parity checking apparatus for use in a data processing system to check the parity of data words of a plurality of bits each, the data processing system being controlled by instructions which determine operations to be executed, comprising:
    means for generating a first parity bit representing the parity of a preselected portion of a data word, responsive to the generation of the data word;
    means for storing the first parity bit;
    the data processing system being adapted to provide, for each instruction, a bit which indicates whether such instruction results in data with valid parity, said bit being designated the parity valid bit;

means for storing the parity valid bit;

means for retreiving the first parity bit and the parity valid bit from both said means for storing, in response to an instruction which causes the reading of said data word;

said read instruction providing a bit to indicate whether parity should be checked in conjuction with such instruction, said bit being designated the check bit; and means for producing a parity error signal representing the existance of a parity error in response to the parity valid bit indicating valid parity, the check bit indicating that parity should be checked, and the parity bit indicating incorrect parity.

3. The apparatus of claim 2 further including means for generating a second parity bit representing the parity of the preselected portion of the data word, in association with the reading of the data word; and said parity error signal being produced only in response to the first and second parity bits not indicating the same, correct parity.

4. In a data processing system, the method of checking the parity of portions of data words employed as operands in arithmetic operations or produced as the results of such operations, said operation being performed by an arithmetic logic unit in response to instructions provided thereto, comprising the steps of:

providing a bit in association with each instruction, for indicating whether the instruction produces a result having valid parity, said bit being designated the parity valid bit;

generating a parity bit indicative of whether said portion of said word has correct parity;

generating a parity error signal in response to said parity bit indicating incorrect parity and said parity valid bit indicating that parity is valid and inhibiting the generation of the parity error signal when the parity valid bit indicates that parity is not valid.

* * * * *